United States Patent [19]

Thum

[11] Patent Number: 5,071,188
[45] Date of Patent: Dec. 10, 1991

[54] FRAME STRUCTURE FOR AN END REGION OF A MOTOR VEHICLE

[75] Inventor: Holger-Michael Thum, Braunschweig, Fed. Rep. of Germany

[73] Assignee: Volkswagen AG, Fed. Rep. of Germany

[21] Appl. No.: 588,189

[22] Filed: Sep. 26, 1990

[30] Foreign Application Priority Data

Oct. 4, 1989 [DE] Fed. Rep. of Germany ....... 3933129

[51] Int. Cl.$^5$ ............................................. B60R 27/00
[52] U.S. Cl. .................................. 296/205; 296/189; 296/194; 296/199
[58] Field of Search .............. 296/188, 189, 194, 195, 296/197, 103, 205

[56] References Cited

U.S. PATENT DOCUMENTS

| 1,523,636 | 1/1925 | Dunn | 296/203 |
|---|---|---|---|
| 1,876,905 | 9/1932 | Freeman et al. | 296/204 |
| 2,047,336 | 7/1936 | Stout | 296/203 |
| 4,950,026 | 8/1990 | Emmons | 296/205 X |

FOREIGN PATENT DOCUMENTS

| 179714 | 9/1954 | Austria | 296/203 |
|---|---|---|---|
| 554868 | 7/1932 | Fed. Rep. of Germany | 296/203 |
| 621640 | 11/1935 | Fed. Rep. of Germany | 296/203 |

Primary Examiner—Margaret A. Focarino
Assistant Examiner—Gary C. Hoge
Attorney, Agent, or Firm—Brumbaugh, Graves, Donohue & Raymond

[57] ABSTRACT

In the typical embodiment described in the specification, a rigid frame structure for an end region of a motor vehicle is assembled exclusively from triangles of elements in an octahedral arrangement so as to provide a favorable force-to-travel characteristic in the event of a collision. In the octahedral arrangement, an end triangle of elements forming the end of the vehicle points upward with an apex, and a triangle of elements that is substantially parallel to the end triangle and serves the purpose of mounting to an adjacent vehicle region and has a downwardly pointing apex.

15 Claims, 4 Drawing Sheets

FRAME STRUCTURE FOR AN END REGION OF A MOTOR VEHICLE

BACKGROUND OF THE INVENTION

This invention relates to frame structures for the front and rear region of a motor vehicle, and more particularly, to new and improved frame structures which are independently rigid and provide for more effective deformation behavior in the event of a collision.

A frame structure for a motor vehicle is disclosed, for example, in U.S. Pat. No. 2,047,336. A large number of the elements in the end regions of that frame structure point obliquely downward. In the event of a collision, this would lead to large bending loads, which would make the conversion of kinetic energy into deformation work practically impossible.

SUMMARY OF THE INVENTION

Accordingly, it is an object of the present invention to provide a new and improved motor vehicle frame structure which overcomes the above-mentioned disadvantages of the prior art.

Another object of the invention is to create a frame structure that is independently rigid so that it can be attached to an adjoining region of the vehicle as a pre-assembled unit which can be optionally equipped with an engine and axle steering control arms.

These and other objects of the invention are attained by constructing a frame structure for a motor vehicle in the shape of an octahedron composed of triangles with the apex of a triangle toward the end of the vehicle pointing upwardly and the apex of a triangle toward the body of the vehicle pointing downwardly.

Such an arrangement makes it possible to create an independently rigid frame structure for the front or rear end region of a vehicle. Furthermore, because the elements of the frame structure extend primarily horizontally, the structure exhibits a downwardly sloping force-to-travel curve for deformation when subject to a collision.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Figure 1:
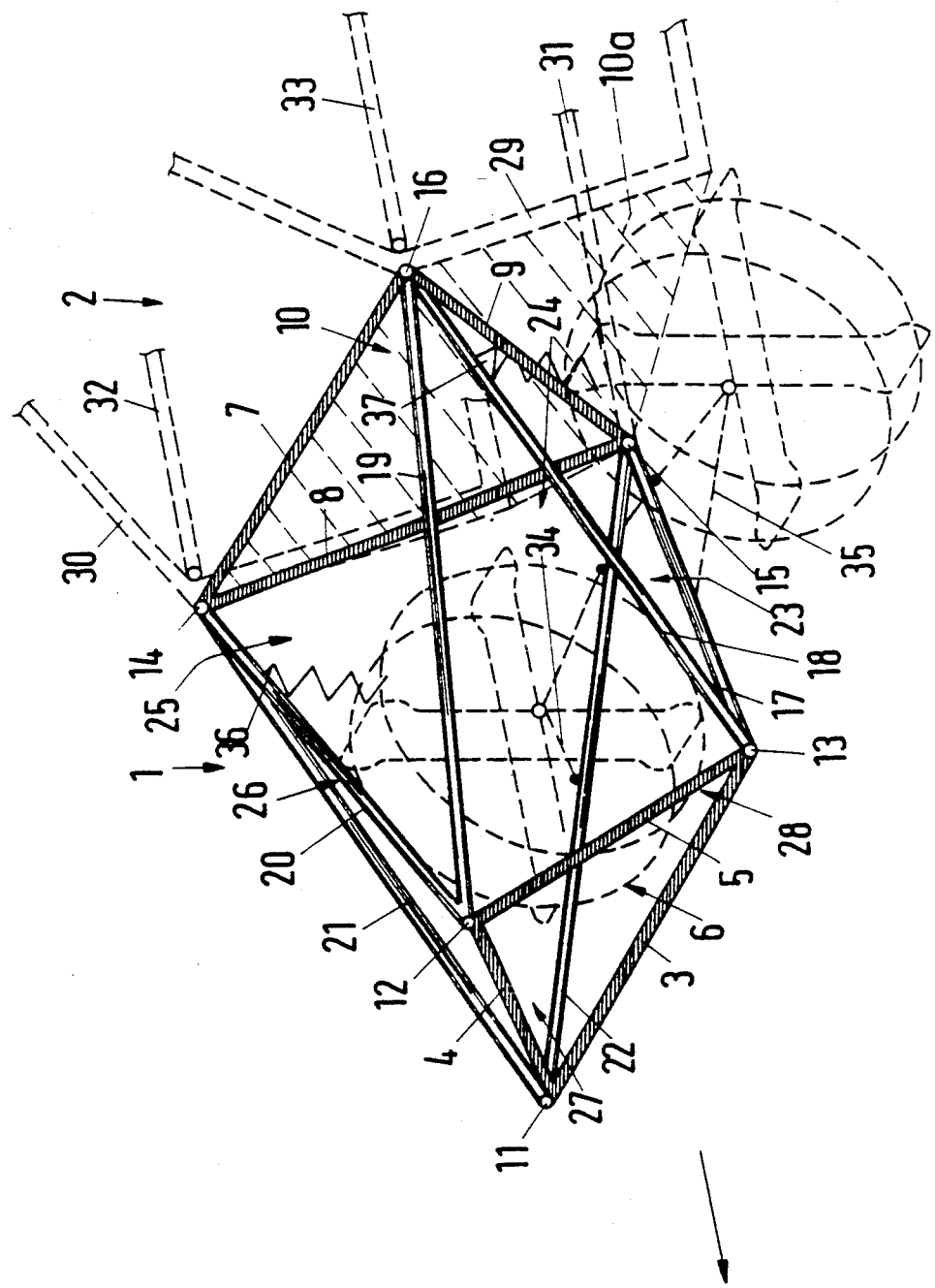
FIG. 1 is a perspective view, seen obliquely from the top front, of a frame structure according to the invention, for the engine compartment of a passenger vehicle.

In the representative embodiment of the invention shown in FIG. 1, a frame structure 1 is disposed adjacent to a passenger compartment 2. The frame structure 1 has the form of an octahedron wherein each of the eight faces of the octahedron is a triangle. Three front elements 3, 4 and 5 of the octahedron form an end triangle 6 at the end farthest from the passenger compartment and three further elements 7, 8 and 9 form a triangle 10 at the mounting end of the frame. The apex of the triangle 6 points upwardly while the apex of the triangle 10 points downwardly.

Figure 5:
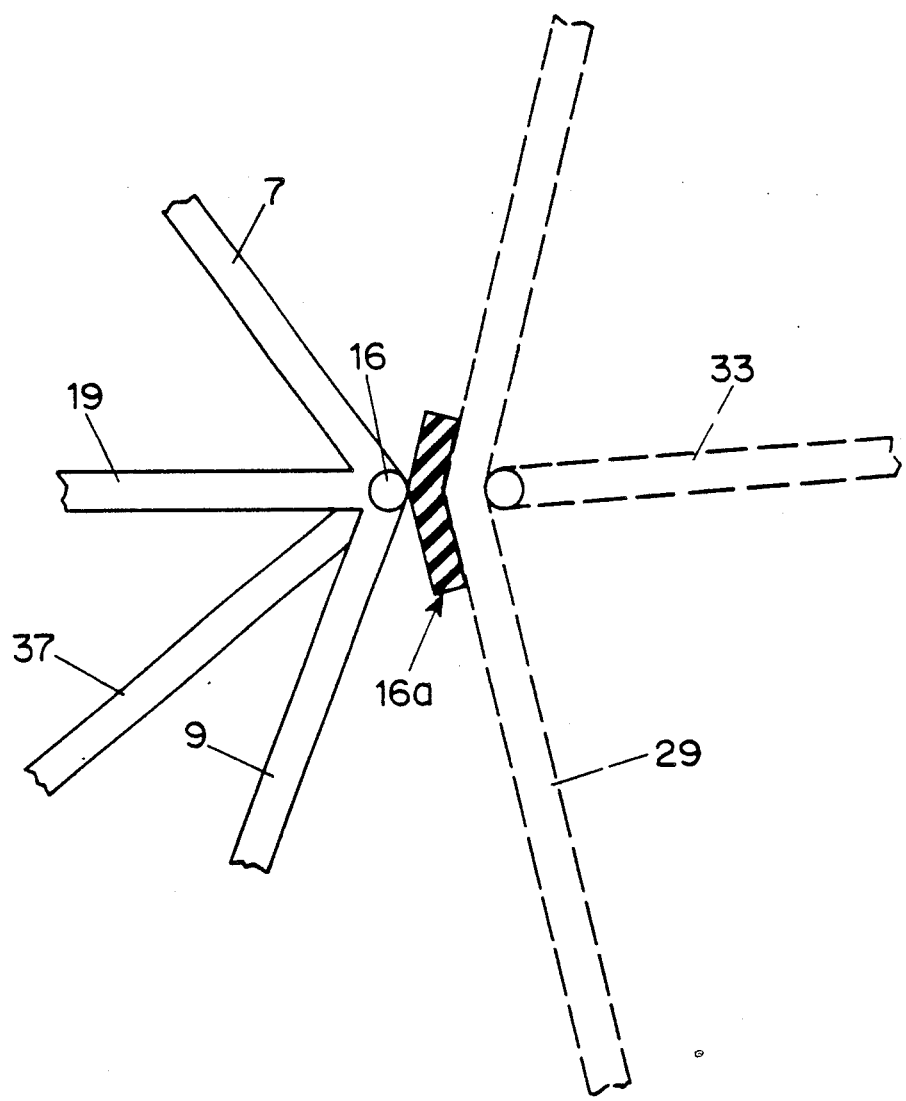
FIG. 5 is a cross-sectional view showing a joint with an elastic intermediate layer.

The elements forming the two triangles 6 and 10 are joined not only to one another but also to further elements 17, 18, 19, 20, 21 and 22 of the octahedron via joints 11, 12 and 13 and 14, 15, 16, respectively. These elements keep the aforementioned two triangles 6 and 10 rigidly braced against one another in the longitudinal direction of the vehicle and, in turn, along with elements 3, 4 and 5 and 7, 8 and 9 or triangles 6 and 10, they form further triangles 23, 24, 25, 26, 27 and 28. Accordingly, the frame structure 1 comprises a total of eight triangles, which form a rigid assembly that can be attached in the form of a prefabricated assembly unit to the adjoining passenger compartment 2 at the joints 14, 15 and 16 so that the triangle 10 is a component of the fire wall 10a of the vehicle. Because of the rigidity of the frame structure 1, the connections at the joints 14, 15 and 16 may include elastic intermediate layers, in order to lessen the transmission of sound to the passenger compartment. Futhermore, the support members need not be rigidly connected to one another at the joints. FIG. 5 illustrates a conventional elastic connection containing an elastic intermediate layer 16a at the joint 16 between the components 19 and 29.

Portions of the passenger compartment shown in FIG. 1 include two A-frame columns 29 and 30, a middle bottom beam 31 for supporting the joint 15, and door-support members 32 and 33, which extend approximately parallel to the longitudinal direction of the vehicle and serve to support joints 14 and 16.

Because of the stability of the frame structure 1, the elements 17 and 22 can be designed for securing axle steering control arms 34 and 35, while the elements 18 and 20 can be equipped with corresponding suspension strut seats 36 and 37. These are of a known conventional design and are therefore not shown here in detail.

The elements 17-22 which extend between the two triangles 6 and 7 are deformable in order to provide for the conversion of kinetic energy into deformation work in the event of a collision.

Figure 2:
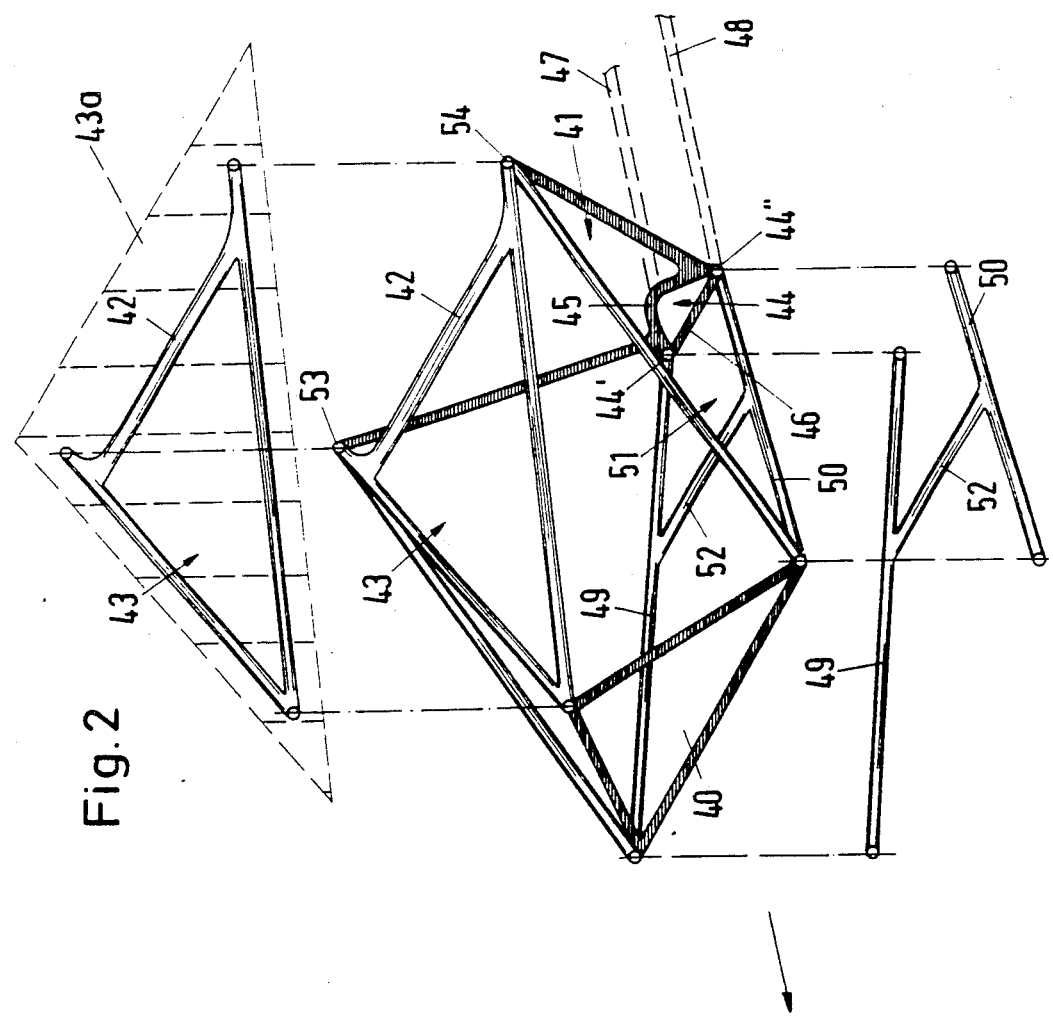
FIG. 2, seen from the same perspective of FIG. 1, is an exploded view of an alternate embodiment of the frame structure.

FIG. 2 shows a representative alternative embodiment of the invention. In this embodiment, an end triangle 40 has the same design as its counterpart triangle 6 in FIG. 1.

A mounting-end triangle 41, of FIG. 2, however, differs in two ways from its counterpart triangle 10 in FIG. 1. A transverse element 42 passes in front of the actual plane of the triangle 41 because it extends not from two joints 53 and 54 which support the triangle 43 but rather from points in the interior of triangle 43. As illustrated in FIG. 2, the triangle 43 may be part of a separate lid component such as an engine hood 43a of the vehicle. The second difference in the mounting-end triangle 41 compared with the corresponding triangle of FIG. 1 is that a lower joint 44 contains a transverse bridge element 45, which is curved convexly upward and is considerably shorter than transverse element 42, in combination with an elongated closing support member 46. In FIG. 1 a single middle bottom beam 31 is provided to support the joint shown at 15, but the exemplary embodiment of FIG. 2 has two such middle longitudinal beams 47 and 48 because the joint 44 is split into two joints 44' and 44" located relatively close together.

Two elements 49 and 50 of a lower triangle 51 are further joined by means of an additional transverse element 52; as the lower portion of the exploded view in FIG. 2 shows. This unit forms a prefabricated auxiliary frame for an engine, not shown, in particular an internal combustion engine for the motor vehicle.

It should be noted that the joints 53 and 54 are intended for mounting the frame to an adjacent passenger compartment, which is not shown in FIG. 2.

It is seen particularly clearly in FIG. 2 that the invention not only has the advantages already described in terms of rigidity and crash behavior, but can also take advantage of modern assembly techniques (production of prefabricated units).

Figure 3:
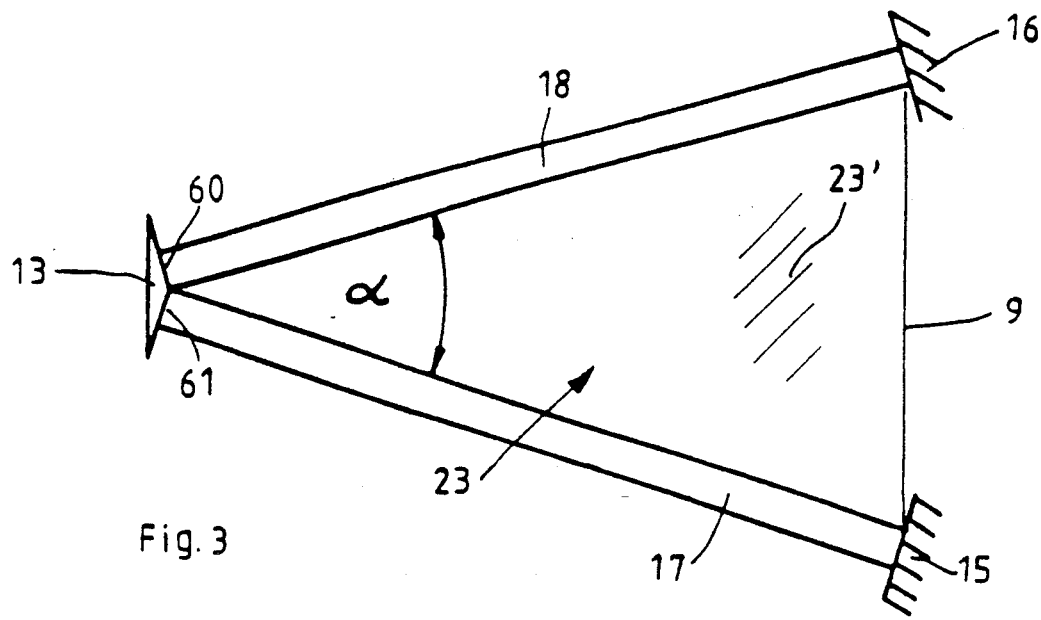
FIG. 3 is a fragmentary view illustrating the form of one of the triangles of frame structure of the invention in its original state.
Figure 4:
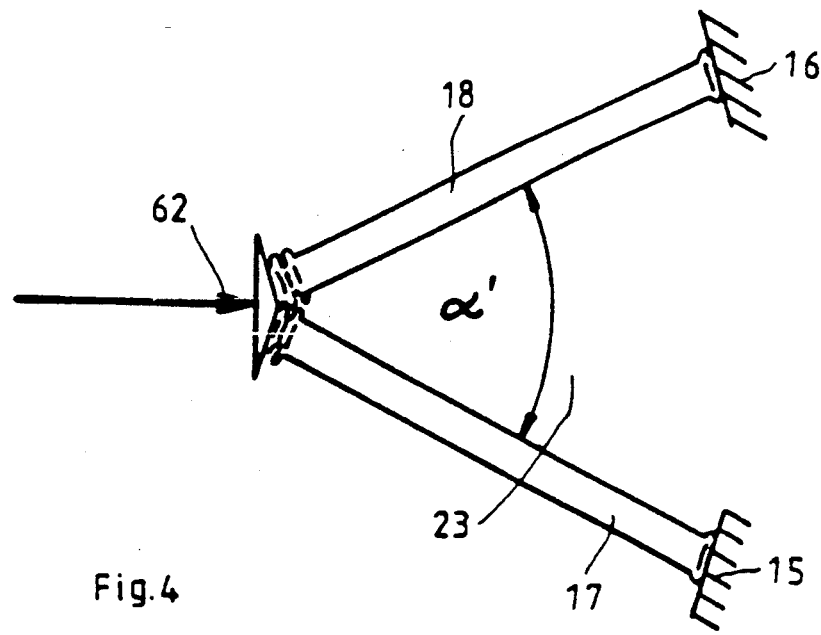
FIG. 4 is a view similar to FIG. 3 showing the form of the triangle after a collision.

FIGS. 3 and 4 illustrate the deformation behavior of one triangle of the elements of the invention, in this case the triangle 23 in FIG. 1. As shown by shading at 23' in FIG. 3, the elements of each of the triangles, or of some of the triangles, can be joined together by sheet-metal panels.

In the initial state, the triangle 23 is an isosceles (or equilateral) triangle having an apex angle $\alpha$. Elements 17 and 18, which are capable of deformation in the direction of their axis, for example by crease-type buckling, are guided on the joint 13, for instance by telescoping guides 60 and 61, in such a way that buckling in response to the force exerted by a collision is prevented. This is indicated by the arrow 62 in FIG. 4. The deformation of elements 17 and 18 cause the apex angle $\alpha$ to be enlarged to the value $\alpha'$ (FIG. 4). Thus upon further deformation, assuming a constant mean crease-type buckling force, the force components extending in the direction of the axes of elements 17 and 18 decrease, and the force-to-travel curve correspondingly follows approximately a cosine function.

It should be noted at this point that the deformation of the elements can also be effected in some other way, for instance by tubular flaring or slitting. In principle, the deformation elements can also be embodied as hydraulic dampers.

In this connection, a further advantage of the frame structure described is that even in a crash at an oblique angle, a large proportion of the frame elements embodied as deformation elements remain effective.

Although the invention has been described herein with reference to specific embodiments, many modifications and variations therein will readily occur to those skilled in the art. Accordingly, all such variations and modifications are included within the intended scope of the invention.

I claim:

1. A frame structure for an end region of a motor vehicle comprising triangular frame element means including eight triangle elements having triangular faces which are joined with their faces disposed at angles to each other to form an octahedron, the eight triangle elements of the octahedron including an outer end triangle element having an apex pointing upwardly, a mounting-end triangle element which extends approximately parallel to the outer end triangle element and is adjacent to an adjoining passenger compartment and has an apex pointing downwardly, a first support triangle element extending between the outer end triangle element and the mounting-end triangle element and having an apex at the apex of the outer end triangle element, and a second support triangle element extending between the outer end triangle element and the mounting-end triangle element and having an apex at the apex of the mounting-end triangle element.

2. A frame structure for an end region of a motor vehicle according to claim 1 including at least one frame element formed as a deformation element for conversion of energy in a collision.

3. A frame structure for an end region of a motor vehicle comprising triangular frame element means which are joined to form an octahedron, the octahedron including an outer end triangle having an apex pointing upwardly and a mounting-end triangle which extends approximately parallel to the outer end triangle and is adjacent to an adjoining passenger compartment and has an apex pointing downwardly including guide means at a region where frame elements are joined for inducing deformations in the frame elements along their axes.

4. A frame structure for an end region of a motor vehicle according to claim 3 wherein the guide means comprise telescoping guides.

5. A frame structure for an end region of a motor vehicle including eight substantially triangular frame elements having substantially triangular faces which are joined with their faces disposed at angles to each other to form an octahedron, the eight substantially triangular frame elements including an outer end element having an apex pointing upwardly, a mounting-end element adjacent to an adjoining passenger compartment and extending approximately parallel to the outer end element and having a truncated apex pointing downwardly, a first support element extending between the outer end element and the mounting-end element and having an apex at the apex of the outer end element, and a second support element extending between the outer end element and the mounting-end element and having a truncated apex at the truncated apex of the mounting-end element, wherein the downwardly-pointing truncated apex of the mounting-end triangle comprises a transversely extending bridge.

6. A frame structure for an end region of a motor vehicle according to claim 5 wherein the transversely extending bridge is convexly curved upward and its ends are joined by an elongated closure element.

7. A frame structure for an end region of a motor vehicle according to claim 1, wherein the elements of at least one of the triangles are joined by a sheet-metal panel.

8. A frame structure for an end region of a motor vehicle according to claim 1, wherein the mounting-end triangle is a component of a transverse wall of the vehicle.

9. A frame structure for an end region of a motor vehicle according to claim 1, wherein an upper triangle is integrated into a lid of the vehicle.

10. A frame structure for an end region of a motor vehicle according to claim 1, wherein a lower triangle forms an auxiliary frame for supporting a component of the vehicle.

11. A frame structure for an end region of a motor vehicle according to claim 1, wherein frame elements extending between the lower vertices of the end triangle and the upper vertices of the mounting end triangle are provided with suspension strut seats.

12. A frame structure for an end region of a motor vehicle according to claim 5, wherein at least one of the individual substantially triangular frame elements includes an additional stiffening support member.

13. A frame element for an end region of a motor vehicle comprising triangular frame element means which are joined to form an octahedron, the octahedron including an outer end triangle having an apex pointing upwardly and a mounting-end triangle which extends approximately parallel to the outer end triangle and is adjacent to an adjoining passenger compartment and has an apex pointing downwardly, wherein the apex of the mounting-end triangle is supported by at least one middle longitudinal beam of the vehicle.

14. A frame structure for an end region of a motor vehicle comprising triangular frame element means which are joined to form an octahedron, the octahedron including an outer end triangle having an apex pointing upwardly and a mounting-end triangle which extends approximately parallel to the outer end triangle and is adjacent to an adjoining passenger compartment and has an apex pointing downwardly, wherein the upper vertices of the mounting-end triangle are supported by door-support members of the vehicle that extend substantially horizontally.

15. A frame structure for an end region of a motor vehicle comprising triangular frame element means which are joined to form an octahedron, the octahedron including an outer end triangle having an apex pointing upwardly and a mounting-end triangle which extends approximately parallel to the outer end triangle and is adjacent to an adjoining passenger compartment and has an apex pointing downwardly, wherein the connections of the frame structure to the adjoining passenger compartment include elastic intermediate layers.

* * * * *